T. G. Bailey,
Buckle.

No. 3,072. Reissued Aug. 11, 1868.

Witnesses:
Thomas D. Stetson
D. W. Stetson

Inventor:
Truman G. Bailey

N. PETERS, PHOTO-LITHOGRAPHER WASHINGTON, D. C.

United States Patent Office.

TRUMAN G. BAILEY, OF AMENIA, NEW YORK.

*Letters Patent No.* 48,503, *dated July* 4, 1865; *reissue No.* 3,072, *dated August* 11, 1868.

IMPROVED BUCKLE.

The Schedule referred to in these Letters Patent and making part of the same.

TO ALL WHOM IT MAY CONCERN:

Be it known that I, TRUMAN G. BAILEY, of Amenia, in the county of Dutchess, in the State of New York, have invented certain new and useful Improvements in Buckles for use in harnesses and analogous situations; and I do hereby declare that the following is a full, clear, and exact description of the same, and the various parts thereof, reference being had to the annexed drawings, which form a part of this specification, wherein—

Similar letters of reference indicate like parts in all the figures.

Figure 3:
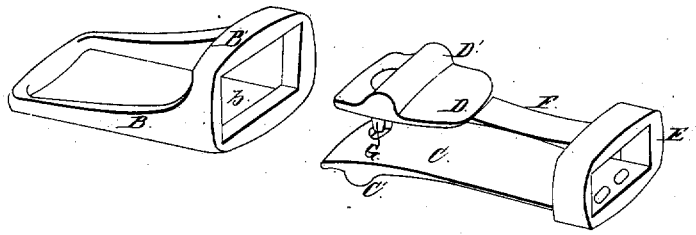
Figure 3 represents the metal parts detached from the leather and from each other.
Figure 2:
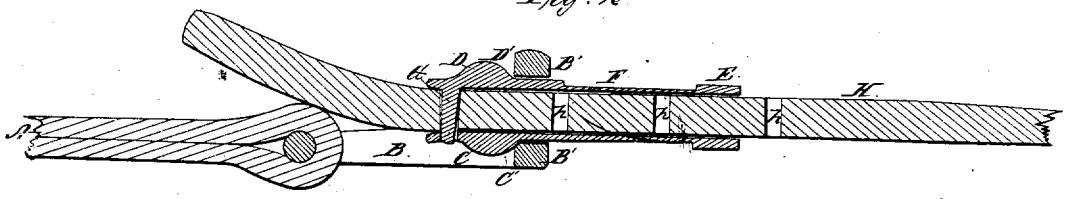
Figure 2 represents a sectional view, on the line S S in fig. 1.
Figure 1:
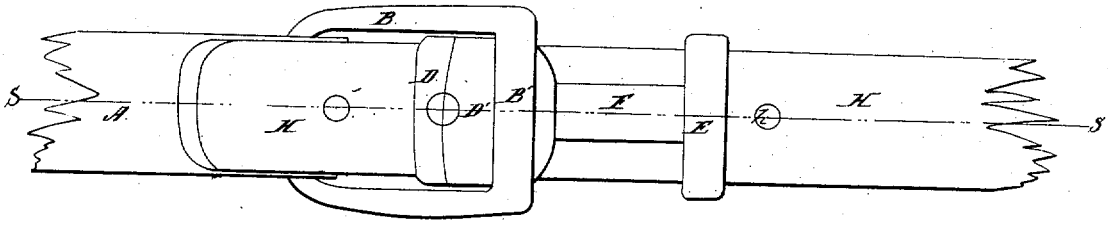
Figure 1 represents a plane view of the buckle complete, as applied to a trace. The trace and the hames-tug are represented in place.

My invention is intended to obviate some of the various difficulties incident to the use of ordinary buckles, more particularly the trace-buckles of heavy harnesses.

In such situations, the great strain on the tongue is liable to tear and weaken the leather, and the severe bending to which the stiff mass of leather is subjected makes it difficult to change the position of the parts so as to shorten or lengthen the trace, and also leaves indentations and bends in the leather, which impair the appearance of the harness, and tends to wear it out more rapidly, especially after the buckle has been pressed any considerable time in one position on the trace.

A buckle, with the improvements which I have invented, takes a very large, and, probably, the principal portion of the strain, by compression of the trace upon the outer surface thereof, dividing the strain between a tongue, operating in conjunction with such compression, which tongue passes through holes made in the trace for that purpose, in their ordinary positions, said compression being effected by a wedge or wedges, in such bevelled form that the wedge-like action producing the compression may be proportioned to the strain on the trace.

I will describe my improvements in a buckle, as applied to connecting a hames-tug and trace, it being understood that its construction and arrangement are the same in other positions and for other uses, the parts being, of course, made lighter or heavier, according to the strains for which they are intended.

To enable others skilled in the art to make and use my improvements, I will proceed to describe the same, and the form of the several parts, when complete and ready for use.

A is the hames-tug, connected in the ordinary manner to a hames, not represented.

I make the buckle-frame, B, in the general form represented in the drawings, with a rectangular aperture, *b*, through which the trace passes, and where the principal compression takes place, by means of a wedge or wedges in bevelled form, as hereinafter particularly described, such aperture being formed and enclosed by the loop or strap $B^1$, which should be of sufficient width and strength to enable such wedge or wedges to make the proper compression. The whole frame may be made of malleable cast iron, wrought iron, steel, or other suitable material for the purpose indicated.

C and D are a pair of wedges, bevelled on the back thereof, for the purpose of effecting the compression aforesaid, one, D, with a tongue, G, and the other, C, without a tongue, but it is immaterial upon which wedge the tongue is formed, except in the matter of convenience, in shortening and lengthening the trace. The wedges C and D may either or both of them be roughened on the inside, if preferred, in order that they may take a more firm hold on the surface of the trace where the compression takes place. I prefer, however, to have them smooth, so that the surface of the leather may not be marred and broken.

If desired, the wedge which has not the tongue G forming a part thereof may be dispensed with, and instead thereof a plain plate of metal may be used, but, in that case, the bevelled back of the tongued wedge should be made at a more obtuse angle.

The wedges C and D must each be kept in place by some kind of device which will allow them to play backwards and forwards while in use.

As one form of device for that purpose, I make a loop or strap, E, simply for the purpose of holding one or both of the wedges C and D in place, and facilitating their action, and I connect the outer wedge, D, to the loop or strap E for that purpose, by means of a steel spring, F, which also affords sufficient elasticity to allow the wedge D to be moved up and down to a proper extent, when it becomes necessary to shorten or lengthen the trace, or for any other purpose.

But it is not essential that the communication F, between the wedge D and the strap E, should be in the form of a spring. A flexible hinge or movable joint, of any suitable character, may be employed in lieu of the spring, or the wedge D may be held in place and made to move backward or forward by some ordinary device connected with the strap $B^1$. The wedge C may be made movable, instead of the wedge D, if desired, and one or both wedges may be connected to the strap E by elastic or other movable connections.

The wedge D is armed with a stout spur or tongue, G, which may be cast or forged thereon, or may be secured by riveting, screwing, or any other ordinary means.

This support G is of sufficient length to extend quite across the space between the inner faces of the wedges, when in use, and to stand in a corresponding hole opposite.

In order to secure the compression of the trace effectually, by means of said wedges C and D, the outer face of one or both of them is made in a bevelled form, at such an angle as may be desired, as shown at C and $D^1$.

The angle, particularly in the wedge D, should be in degree sufficient to both produce a quick and powerful compression when the trace is drawn, and also so as to allow the wedge to be readily moved back, in case it is necessary to lengthen or shorten the trace, or for any other purpose.

The trace H, made up of one or more thicknesses of material, is provided with holes, *h h h*, as usual, but the holes may be considerably smaller than is necessary with the ordinary trace-buckle, and consequently such holes will weaken the trace to a less degree than usual.

To introduce the trace, the wedges C and D are pushed towards the left hand in the drawing, which liberates them from their confinement within the strap $B^1$, and allows a ready opening by the yielding of the spring F, or the operation of the other device, as above indicated. On opening the space below the end of the tongue G with the fingers, so as to pull said tongue out of the way, the end of the trace H may be readily introduced endwise, and thrust forward to a sufficient extent to cause one of the holes *h h h* to come opposite to the point of the tongue G, and the same inserted in such hole, and upon the wedges C and D being slid back within the aperture *b*, the trace will be found securely fixed.

Any strain applied to the trace H, to pull it backward, in the ordinary manner, brings the bevelled faces $C^1$ and $D^1$ of the wedges C and D into such relation with the confining-strap $B^1$ that the desired compression takes place with a force proportioned to the pull on the trace.

The tongue G provides against a possibility of slipping or displacement of the parts when the trace is slacked, and also takes a portion of the strain when the trace is pulled forcibly, the whole strain being divided, as above intimated, a part being exerted on the tongue G with an effect tending to tear the leather, but not in sufficient force to endanger such accident, while another portion is borne (and therein consists the merit of my improvement) by the friction or adhesion of the outer surface or surfaces of the trace coming in contact with the inner sides of the wedges C and D.

When it is desired to shorten or lengthen the trace, the operation is similar to that just described for putting in the same, the wedges being slid forward, (or to the left in the drawings,) and the wedge with the tongue attached pulled up far enough to effectually liberate the trace from the tongue, after which it can be shifted to any desired new position, it being presumed that the holes *h h h* are properly located to allow of the adjustment required.

A buckle made with my improvements may be plated with precious metals, and made in various ornamental shapes, which I do not deem it necessary to represent.

What I claim as my invention, and desire to secure by Letters Patent, is—

1. The wedge C, and also the wedge D, with the tongue G attached, and forming a part thereof, each of said wedges separately, and also in combination with each other, when made in the form described, and applied to a buckle-frame, for the purpose of relieving, by compression, the strain upon the trace, substantially as above described.

2. I also claim the wedges C and D, with their inclined faces $C^1$ and $D^1$ and tongue or spur G, arranged relatively to the enclosing-strap $B^1$, the buckle-frame B, the strap E, and spring F, or each of their equivalents, substantially in the manner and for the purpose herein set forth.

TRUMAN G. BAILEY.

Witnesses:

W. R. CHAMBERLIN,

N. B. SMITH.